Patented May 9, 1950

2,507,338

UNITED STATES PATENT OFFICE 2,507,338

POLYMERIZATION OF ALPHA ALKYL STYRENES

Randall G. Heiligmann, Yeadon, Pa., assignor to The Atlantic Refining Company, Philadelphia, Pa., a corporation of Pennsylvania No Drawing. Application June 9, 1945, Serial No. 598,634

5 Claims. (Cl. 260—93.5)

The present invention relates to the polymerization of unsaturated compounds to form useful resinous materials, and relates more particularly to the polymerization of an alpha alkyl styrene, mixtures of alpha alkyl styrenes, or polymerizable mixtures containing substantial quantities of an alpha alkyl styrene.

An object of this invention is the production of resinous materials by the polymerization of alpha alkyl styrenes in the presence of an active Friedel-Crafts type catalyst and a diluent comprising a normal olefin containing not more than 6 carbon atoms, at a temperature below 10° C. and preferably between —50° C. and the freezing point of diluted reactants.

It has been proposed heretofore to effect polymerization of alpha alkyl styrene and its homologues in the presence of a Friedel-Crafts type catalyst and a diluent such as halogenated hydrocarbons, i. e., the lower alkyl chlorides such as ethyl chloride and the like. While it was possible to produce substantially solid resins at relatively low temperatures by this method, it was found that the alkyl chloride had a tendency to inhibit extended polymerization either by causing stoppage of the chain reaction or by entering such reaction and becoming a part of the polymer molecule. Regardless of the exact cause, the use of the alkyl halide as a diluent resulted in the formation of polymers having a molecular weight only 50% to 70% as high as that of polymers produced in the presence of a normal olefin containing not more than 6 carbon atoms at temperatures at which such diluent may be effectively employed.

I have found that by using as a diluent for the alpha alkyl styrene or mixture of alpha alkyl styrenes, a normal olefin which is substantially inert and does not itself polymerize, or copolymerize with the alpha alkyl styrene, or interfere with the polymerization of the alpha alkyl styrene in the presence of a Friedel-Crafts catalyst at temperatures below 10° C. and preferably below —50° C., I am able to obtain not only an increase in molecular weight of the polymers but also an improved structure of the solid polymer particles which renders them more easily removable from the polymerization reaction mixture by filtration, as compared with polymers produced in the presence of diluents such as the lower alkyl halides, and especially ethyl chloride.

The normal olefins which may be employed as diluents in accordance with this invention comprise ethylene, propylene, butylene-1, butylene-2, and the normal amylenes and hexylenes. Of these olefins, I prefer to use those containing from 2 to 4 carbon atoms, and which are normally gaseous under ordinary conditions of temperature and pressure, but which may be maintained in a liquid state by the application of pressure or by cooling. In utilizing these diluents in polymerization reactions at temperatures of the order of 0° C. to 10° C., superatmospheric pressure must be applied to maintain them in the liquid state. However, when polymerizations are carried out at —50° C. to —100° C., less pressure is required due to the low temperatures involved. While it is preferred to use one or a mixture of two or more of the mentioned olefins as a diluent, I have found that the presence of the corresponding normal paraffins does not interfere with the polymerization reaction. In general, however, the normal paraffins if used alone do not permit the attaining of polymers of as high a molecular weight as in the case of the normal olefins, although the structure of the solid polymer particles is such as to render separation thereof from the polymerization reaction mixture readily accomplished. It is, therefore, considered within the scope of the present invention to employ as diluents a mixture of normal paraffins and normal olefins having not more than 6 carbon atoms per molecule, the normal paraffins preferably being those of 2 to 4 carbon atoms. These diluents possess the advantage of rapidly and completely precipitating the polymer in the form of a finely divided solid which may be readily separated by filtration. This is in direct contrast to the lower alkyl halides which invariably hold a portion of the polymer in solution and are themselves included in the precipitated polymer. The quantity of normal olefin or paraffin-olefin mixture employed as a diluent may vary from about 1 to 25 volumes per volume of alpha alkyl styrene or of polymerizable mixtures containing an alpha alkyl styrene, depending principally upon the temperature and degree of polymerization desired. Quantities of diluent between 2 and 15 volumes per volume of alpha alkyl styrene are preferred. For example, satisfactory polymerization of alpha methyl styrene at —50° C. in the presence of $AlCl_3$ was obtained when the alpha methyl styrene was diluted with 6 volumes of butylene-1. On the other hand, at much lower temperatures a much greater dilution must be maintained, for example, alpha methyl styrene diluted with 20 volumes of butylene-1 may be successfully polymerized with a $TiCl_4$ catalyst at —95° C. to yield a relatively high molecular weight resin.

The present process is applicable to the homopolymerization of any alpha alkyl styrene or to the copolymerization of any two or more alpha alkyl styrenes. As herein used, the term "alpha alkyl styrene" includes any styrene represented by the formula:

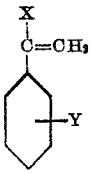

wherein X may be an alkyl group such as methyl, ethyl, propyl, or isopropyl, etc., but is preferably methyl, and wherein Y may be hydrogen or alkyl, such as methyl, ethyl, propyl, and isopropyl.

The process of the present invention is particularly applicable to the production of polymers or copolymers of very high molecular weight, which necessitates the employment of low temperatures, preferably between −50° C. and −150° C., the lower the temperature, the higher the molecular weight attained.

In operating with active Friedel-Crafts type catalysts, it has been found advantageous to first dissolve or disperse the catalyst in a suitable solvent, such as carbon disulfide or a lower alkyl halide, for example, methyl chloride, ethyl chloride, propyl chloride, or isopropyl chloride before bringing it into contact with the alpha alkyl styrene or styrenes to be polymerized. The catalyst solution is most suitably applied in the form of droplets or as a mist or dispersion. Any suitable spraying or atomizing device having jets or orifices of proper restriction may be employed to produce the spray or mist, which may be injected on or under the surface of the reactant mixture. In general, any alkyl halide of suitable freezing point and solvent power may be used as a catalyst solvent, although chlorides are preferred over the corresponding bromides, iodides, and fluorides. Various Friedel-Crafts type catalysts may be satisfactorily employed, including $AlCl_3$, $AlBr_3$, $ZnCl_2$, $TiCl_4$, $SnCl_4$, and $BF_3$, preference being had for $TiCl_4$ since it is more soluble in the various solvents, and particularly carbon disulfide, than the other catalysts mentioned.

In the practice of the invention, a solution of the catalyst in the solvent is first made up at ordinary room temperature, carbon disulfide being the preferred solvent. The concentration of the catalyst in the solution may vary between relatively wide limits, concentrations between 0.25% and 1% being satisfactory, although higher concentrations may be utilized, i. e., up to about 5%. The catalyst solution is then cooled by appropriate means such as by the use of carbon dioxide, or liquefied nitrogen, or liquefied normally gaseous hydrocarbons, for example, ethane, ethylene, or propane to approximately the temperature at which it is desired to carry out the polymerization. The refrigerant used in the cooling of the solution may be applied either externally or internally, but best results have been obtained using the refrigerant externally. Following the cooling operations, the solution in the form of a spray or mist produced by a suitable atomizing device is brought into contact with the alpha alkyl styrene or styrenes to be polymerized, said styrene or styrenes being diluted with a suitable quantity of normal olefin diluent. It has also been found desirable to pre-cool the alpha alkyl styrene or styrenes, after dilution, to substantially the temperature at which it is desired to effect the polymerization, which temperature may be maintained by any appropriate means, for example, indirect heating exchange with solid carbon dioxide, liquefied nitrogen, or liquefied normally gaseous hydrocarbons. During the polymerization, the reaction mixture is usually kept under constant agitation not only as an aid to temperature control but also to prevent discoloration of the polymer. At temperatures of the order of −50° C. to −100° C., the polymer generally forms a slurry of solid particles which may be removed from the reaction mixture by any appropriate means, for example, by decantation or filtration. The complex formed between the catalyst (particularly $AlCl_3$) and the polymer may be decomposed either prior to filtration or subsequently by the addition of agents such as water, or alcohol, or ammonia. The lower aliphatic alcohols such as methyl, ethyl, propyl, and isopropyl are particularly useful in this respect. The polymers may be purified by washing thoroughly with a low boiling petroleum naphtha or similar agent prior to drying.

The present invention may be further illustrated by the following examples, which, however, are not to be taken as limiting the scope thereof:

1. 108 volumes of alpha methyl styrene was diluted with 648 volumes of butylene-1, and the solution was cooled to −50° C. by the direct addition of solid carbon dioxide. 75 volumes of a 1% solution of titanium tetrachloride in carbon disulfide, pre-cooled to −50° C., was injected into the well stirred alpha methyl styrene solution over a period of 10 minutes. Upon completion of the polymerization reaction, the solid polymer particles were filtered from the reaction mixture and washed with 200 volumes of 95% ethyl alcohol which destroyed any remaining catalytic activity. The polymer product was then steam distilled yielding a white granular mass which was readily molded to yield a clear, solid plastic mass. The molecular weight of this polymer was 22,200 as compared to 15,000 for a polymer produced under the same conditions, with the exception that ethyl chloride was substituted for butylene-1 as a diluent for the alpha methyl styrene and as a solvent for the catalyst.

2. 108 volumes of alpha methyl styrene was diluted with 600 volumes of butylene-1, and the solution was cooled with liquid nitrogen to −50° C. 100 volumes of a 1% solution of aluminum chloride in ethyl chloride, pre-cooled to −50° C., was injected into the well stirred alpha methyl styrene solution over a period of 10 minutes. A white mass polymer particle separated from the solution shortly after the addition of the catalyst was initiated. The polymer was filtered from the reaction mixture in the cold, and was washed with 200 volumes of cold 95% ethyl alcohol. Traces of diluent, alcohol, and unreacted monomeric alpha methyl styrene was readily removed from the polymer product by steam distillation to yield a white granular mass which was readily molded to a clear, tough plastic mass. The molecular weight of this polymer was 21,000 as compared with 15,000 for a polymer prepared under similar conditions, with the exception that ethyl chloride was substituted for butylene-1 as a diluent for the alpha methyl styrene.

3. 108 volumes of alpha methyl styrene was diluted with 1400 volumes of liquid propane under a superatmospheric pressure sufficient to maintain the propane in the liquid state, and the solution was cooled with liquid nitrogen to −70° C.

100 volumes of a 1% solution of aluminum chloride in ethyl chloride, pre-cooled to −70° C., was injected into the well stirred alpha methyl styrene solution over a period of 10 minutes. Upon completion of the polymerization reaction, the solid polymer particles were filtered, under pressure, from the reaction mixture, and the cold filter cake was washed with 200 volumes of cold 95% ethyl alcohol. The washed polymer was then steam distilled to remove traces of diluent, alcohol, and unreacted alpha methyl styrene, and there was obtained a polymer product having a molecular weight of 16,800, as compared with 15,600 for a polymer prepared under similar conditions, with the exception that ethyl chloride was substituted for liquid propane as a diluent for the alpha methyl styrene. It will be noted that in this example, using propane as the diluent, the molecular weight of the polymer was considerably lower than in the case of butylene-1 as the diluent, even though the polymerization temperature was 20° C. lower than in the latter case. However, the use of liquid propane did permit rapid and complete precipitation of the polymer in a readily filterable condition.

While it is preferred to employ the spray technique in bringing the solution of the catalyst into contact with the diluted alpha alkyl styrene, especially where a high molecular weight polymer is desired, any other suitable method of contacting the reactant mixture with the catalyst solution may be employed. For example, the process may be executed by simply pouring the catalyst solution into the reactant mixture, the mixture preferably being vigorously agitated. Furthermore, while it is preferred to employ the catalyst in solution, the polymerization reaction may also be effected with the catalyst in the solid or gaseous state, for example, solid finely divided aluminum chloride, or gaseous boron fluoride.

While the present invention has been described particularly with reference to the polymerization of alpha methyl styrene, such invention is equally well adapted in the polymerization of other alpha alkyl styrenes, such as alpha methyl para methyl styrene, alpha methyl para ethyl styrene, alpha methyl para isopropyl styrene, alpha methyl para propyl styrene, alpha methyl meta methyl styrene, alpha ethyl styrene, alpha ethyl para ethyl styrene, and the like.

I claim:

1. A process for homopolymerizing non-nuclearly substituted alpha alkyl styrenes and mono-alkyl nuclearly substituted alpha alkyl styrenes in which the alkyl group contains not more than 3 carbon atoms to solid resins having a molecular weight of at least 21,000, which comprises contacting a solution of said alpha alkyl styrene in 6 to 25 volumes of a liquefied normal mono-olefin having 2 to 4 carbon atoms with 0.25% to 5% of a Friedel-Crafts catalyst at a temperature between −50° C. and −100° C.

2. A process according to claim 1 in which the catalyst is aluminum chloride.

3. A process according to claim 1 in which the catalyst is titanium tetrachloride.

4. A process for homopolymerizing alpha methyl styrene to a solid resin having a molecular weight of at least 21,000, which comprises contacting a solution of alpha methyl styrene in 6 to 25 volumes of liquefied normal mono-olefin having 2 to 4 carbon atoms with about 1% of a Friedel-Crafts catalyst at a temperature between −50° C. and −100° C.

5. A process according to claim 4 in which the mono-olefin is butene-1.

RANDALL G. HEILIGMANN.

REFERENCES CITED

The following references are of record in the file of this patent:

UNITED STATES PATENTS

| Number | Name | Date |
| --- | --- | --- |
| 2,085,535 | Langedijk | June 29, 1937 |
| 2,317,878 | Bannon | Apr. 27, 1943 |
| 2,387,784 | Thomas | Oct. 30, 1945 |
| 2,436,614 | Sparks et al. | Feb. 24, 1948 |

FOREIGN PATENTS

| Number | Country | Date |
| --- | --- | --- |
| 106,371 | Australia | Jan. 26, 1939 |